United States Patent
Ota et al.

(10) Patent No.: US 6,215,944 B1
(45) Date of Patent: Apr. 10, 2001

(54) SEALED FIBER ARRAY AND METHOD FOR MANUFACTURING A SEALED FIBER ARRAY

(75) Inventors: Takashi Ota; Masashi Fukuyama, both of Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/194,350

(22) PCT Filed: Mar. 27, 1998

(86) PCT No.: PCT/JP98/01379

§ 371 Date: Feb. 8, 1999

§ 102(e) Date: Feb. 8, 1999

(87) PCT Pub. No.: WO98/44369

PCT Pub. Date: Oct. 8, 1998

(30) Foreign Application Priority Data

Mar. 27, 1997 (JP) ................................................ 9-075330

(51) Int. Cl.⁷ .................................................... G02B 6/00
(52) U.S. Cl. .............................. 385/137; 385/147; 385/94
(58) Field of Search .................................... 385/137, 147, 385/94

(56) References Cited

U.S. PATENT DOCUMENTS 5,719,978 * 2/1998 Kakii et al. .............................. 385/94

FOREIGN PATENT DOCUMENTS

| | | |
|---|---|---|
| 5-232391 | 9/1993 | (JP) . |
| 7-35958 | 2/1995 | (JP) . |
| 7-14409 | 3/1995 | (JP) . |
| 8-179171 | 7/1996 | (JP) . |
| 8-292332 | 11/1996 | (JP) . |

* cited by examiner

Primary Examiner—Darren Schuberg
Assistant Examiner—Fayez Assaf
(74) Attorney, Agent, or Firm—Burr & Brown

(57) ABSTRACT

A sealed fiber array capable of preventing ambient air from entering into a package through gaps between guide holes and guide pins. The fiber array includes a lower substrate (19) in which V grooves (20) and guide grooves (21) are formed in the lengthwise direction, and an upper substrate (23) having the same dimensions as those of the lower substrate (19) in the lengthwise direction and in the direction perpendicular thereto, and disposed over the lower substrate (19). Guide holes are defined by the V. grooves of the lower substrate (19) and the upper substrate (23). Ambient air is prevented from entering into the package, from the side where the guide holes for the sealed fiber array are provided, toward the opposite side.

20 Claims, 8 Drawing Sheets

FIG_1A
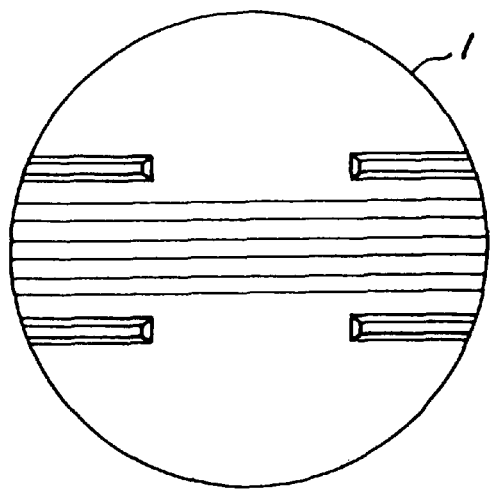
FIG_1B
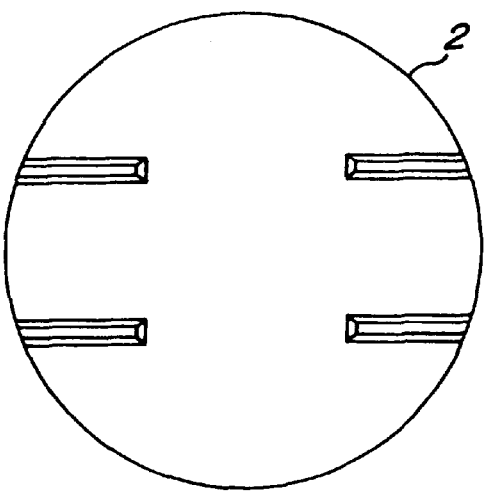
FIG_1C
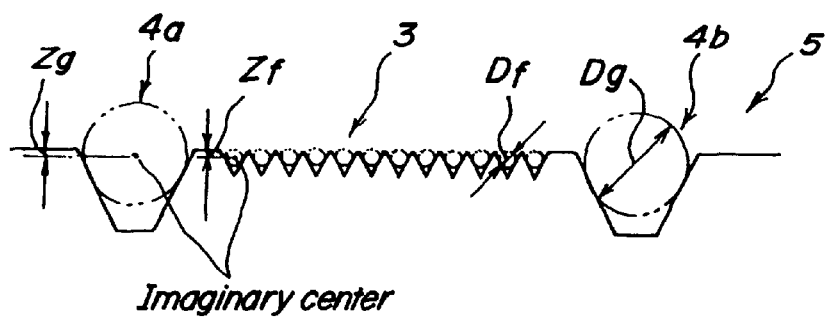
Imaginary center
FIG_1D
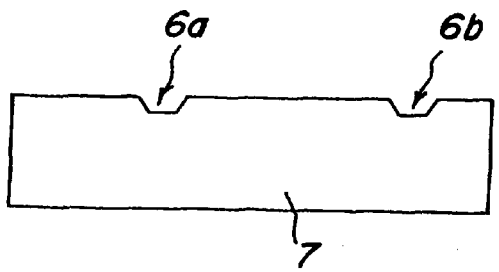

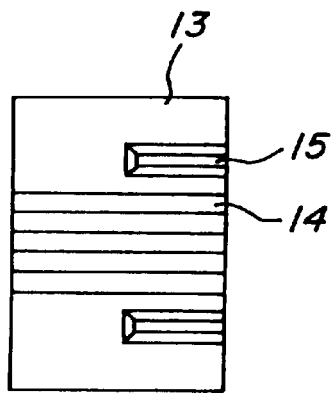
FIG_4A
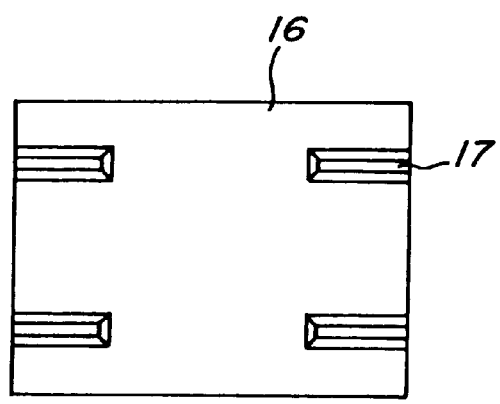
FIG_4B
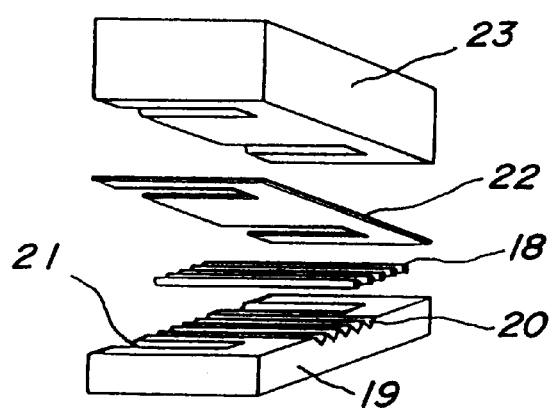
FIG_5

FIG_6
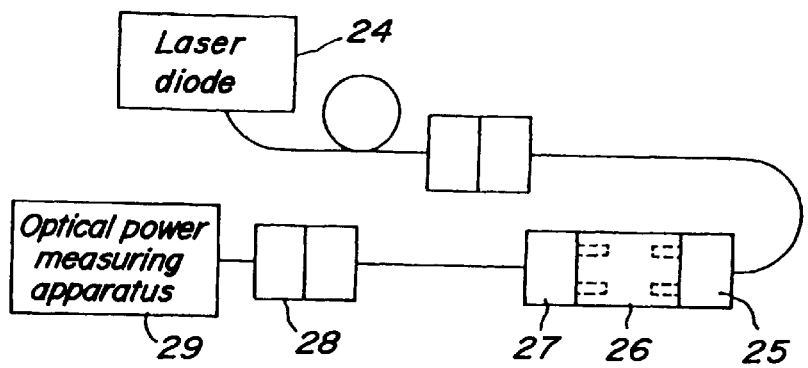
FIG_7A
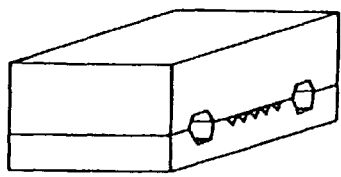
FIG_7B
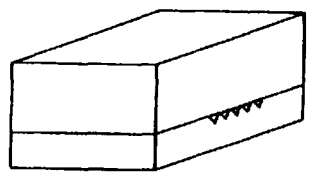
FIG_7C
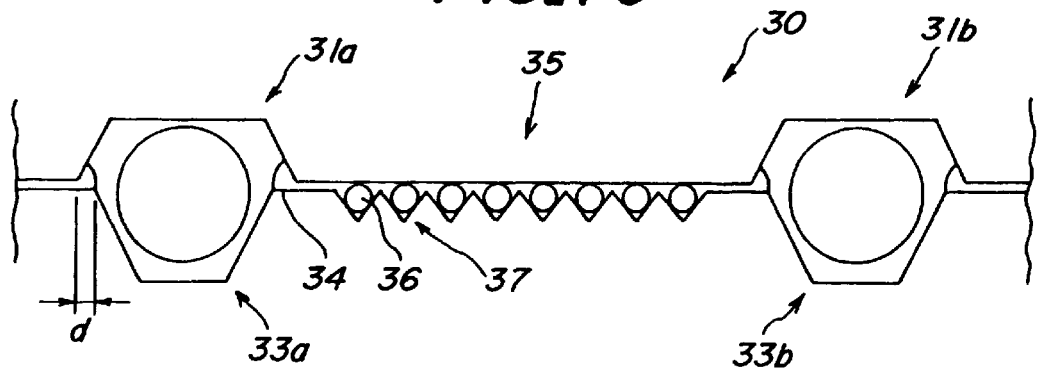

FIG_10
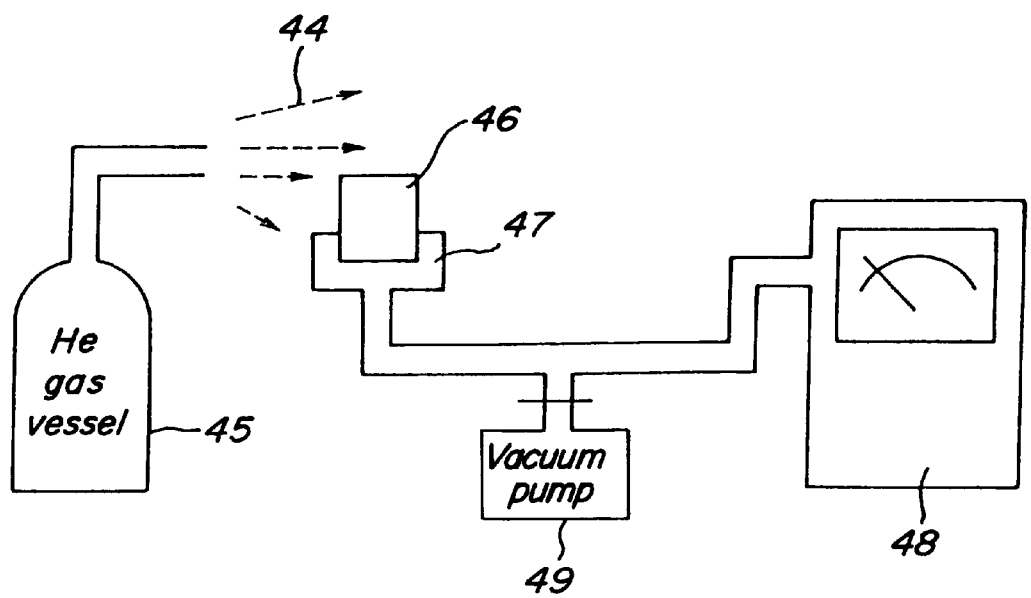

SEALED FIBER ARRAY AND METHOD FOR MANUFACTURING A SEALED FIBER ARRAY

TECHNICAL FIELD

This invention relates to a sealed fiber array for an optical transmission module or the like, capable of performing hermetic sealing (hereinafter, called "sealing") on a package of the transmission module or the like by the fiber array itself.

BACKGROUND ART

A conventional sealed fiber array for an optical transmission module is disclosed, for example, in JP-A-8-179171. In such a sealed fiber array, optical fibers are arranged in respective V grooves, and both ends of the fiber array are polished optically. The end of the fiber array to be exposed to outside of a package of the transmission module is capable of being connected to an optical connector.

To allow connection of such a package to the optical connector, it is necessary to provide one or more grooves for respective guide pins in a substrate of the sealed fiber array. In a traditional sealed fiber array having such V-grooves, the fiber grooves and the guide grooves extend from one end of the substrate to the other, so that guide holes extend through the sealed fiber array from its one end to the other. In this case, however, ambient air may enter into the package, through gaps between the guide holes and the guide pins. In a package in which one or more semiconductor elements such as laser diodes and/or photodiodes are provided, the elements tends to be degrade when exposed to ambient air.

DISCLOSURE OF THE INVENTION

It is therefore an object of the invention is to provide an improved sealed fiber array in which ambient air is prevented from entering into the package through gaps between the guide holes and the guide pins.

According to one aspect of the present invention, there is provided a sealed fiber array comprising: a lower substrate provided in its lengthwise direction with one or more fiber grooves for arranging respective fibers, and one or more guide grooves for arranging respective guide pins to be connected to an external connector; and an upper substrate arranged on the lower substrate so as to fixedly secure the guide pins and the fibers, the upper substrate having the same dimensions in the lengthwise direction and the direction perpendicular thereto as those of the lower substrate; the guide grooves of the lower substrate and the upper substrate forming one or more guide holes such that ambient air is prevented from entering from the side where the guide holes are formed toward the side opposite thereto.

In accordance with such a fiber array, as a sealing function is obtained by forming one or more guide holes such that ambient air is prevented from entering from the side where the guide holes are formed toward the side opposite thereto, one or more elements in a package may not degrade by entering ambient into the package, through gaps between the guide holes and the guide pins.

Preferably, each of the guide grooves has a length in the lengthwise direction thereof, which is not greater than that of the lower substrate in the lengthwise direction thereof.

In this way, by forming the guide grooves not from one end of the lower substrate, the end opposite thereto, but from the one end halfway to the end opposite thereto, the guide holes do not extend to the side (the side to be coupled to one or more optical elements; for example, refer to the above-mentioned JP-A-8-179171) opposite to the side (the side to be connected to connectors) where the guide holes are formed. Thereby, as the sealing function is obtained, one or more elements in a package may not degrade by entering ambient into the package, through gaps between the guide holes and the guide pins.

In this case, fibers extend over the lower substrate in the lengthwise direction thereof, so that the fiber grooves extend over the lower substrate thereof in the lengthwise direction thereof.

Preferably, each of the guide grooves has a length in the lengthwise direction thereof, which is same as that of the lower substrate in the lengthwise direction thereof, and an adhesive is filled at least partly in the guide grooves except the region which extends from one end thereof over a distance which is not greater than the length in the lengthwise direction thereof.

For each of the guide grooves, an adhesive is filled at least partly in the guide grooves except the region which extends from one end thereof over a distance which is not greater than the length in the lengthwise direction thereof, so that the guide holes do not extend to the side opposite to the side where the guide holes are formed. Thereby, as the sealing function is obtained, the elements may not degrade by entering ambient into the package, through gaps between the guide holes and the guide pins. In this case, it is unnecessary to shift the guide pins to be inserted into respective guide holes from an accurate position due to filling with the adhesive.

Preferably, each of the guide grooves has a length in the lengthwise direction thereof, which is same as that of the lower substrate in the lengthwise direction thereof, each of the guide pins extending over a length which is not greater than the length of the guide grooves in the lengthwise direction thereof, and an adhesive is filled between the guide grooves and the corresponding guide pins.

In this way, the adhesive is filled between the guide grooves and the corresponding guide pins, so that more effective sealing function can be obtained. It is also unnecessary to shift the guide pins to be inserted into respective guide holes from an accurate position due to filling with the adhesive.

Preferably, the upper and lower substrates comprise ceramics or glass.

It is preferable to select materials of the upper and the lower substrates in accordance with the coefficients of thermal expansion of one or more optical elements facing to an incident end face of each fiber. In accordance with the sealed fiber array, to fulfill such a requirement, ceramics or glass is selected as those materials. In the case where one or more laser diodes and/or photodiodes are used as optical elements, it is a general practice that gaps are provided between the fiber arrays and each of the laser diodes or photodiodes, and it is thus unnecessary to consider such a thing especially. Nevertheless, it is preferable to match the coefficients of thermal expansion of the optical elements with each other.

Preferably, the lower substrate is made by a press molding.

The guide grooves can be easily formed in the lower substrate by Si etching. However, the guide grooves on the lower substrate made of ceramics or glass, are provided by grinding. In grinding, since a grinder having a certain diameter (for example, several tens mm) is typically used, when the guide grooves are formed from the end thereof halfway to the end opposite thereto, each end of the guide grooves is rounded even if the grinding is stopped halfway. Therefore, the guide grooves having a desired shape at the end cannot be formed. This is the ground why the lower substrate is made by a press molding. The press molding may be carried out by a method described in JP-A-8-46819, for example.

Preferably, the surface of the lower substrate formed with the fiber grooves and the guide grooves, and the surface of the upper substrate to be jointed on the surface of the lower substrate, are metallized and jointed with each other by a solder.

In a module which requires sealing, even an adhesion with a resin may cause trouble because one or more optical elements (especially laser diodes and photodiodes) in the package tend to be degraded by a gas arising from the resin itself. To avoid such a problem, the surface of the lower substrate formed with the fiber grooves and the guide grooves, and the surface of the upper substrate to be jointed on the surface of the lower substrate, are jointed with each other by a solder. As the ceramics or the glass is not wet with the solder, it is preferred that those surfaces to be jointed with each other are metallized.

Preferably, the solder comprises an Au-based solder.

The elements may degrade if flux is used with the solder, so that it is preferred to use the Au-based solder flowing an extremely narrow portion such as the fiber grooves. As used herein, the "Au-based solder" encompasses Au/Sn-, Au/Ge- and Au/Si-solder. From the viewpoint of improving the reliability, a eutectic solder thereof may be used.

Preferably, the metallized surfaces comprise a vapor-deposited or spattered thin Au film.

When the solder is an Au-based solder, the solder readily becomes wet by forming a metallic layer with Au so that the joint between the upper substrate and the lower substrate becomes optimum.

Preferably, the surface of the lower substrate, except the guide grooves, is metallized.

To joint the upper substrate and the lower substrate with each other effectively and thereby obtain a sufficient sealing function, it is necessary to diffuse the solder over the surface of the lower substrate formed with the fiber grooves and the guide grooves. However, as described above, it is necessary not to provide the solder on the guide grooves in order that the guiding function is not inhibited. The solder flows only over the metallized portion so that the regions over which the solder should not flow, including the guide grooves, are not subjected to metallization. In other words, the regions except the guide grooves are metallized.

Preferably, the upper substrate is formed with guide grooves corresponding to the guide groove in the lower substrate, to extend in the lengthwise direction thereof.

By forming the upper substrate with such guide grooves, the positioning of the guide pins can be performed more accurately.

Preferably, each guide groove of the upper substrate has a maximum width which is different from that of the corresponding guide groove in the lower substrate, so as to form steps for defining spaces which function as solder ponds.

By defining such steps, when the upper and the lower substrates are jointed with each other by the solder, it is possible to achieve a satisfactory control of the amount of the solder to be provided on jointing side thereof, and it is thus unnecessary to apply an excessive load in the jointing.

Preferably, each guide hole has tip end of a tapered or hemispherical shape.

When the tip end has such a shape, the stress can be reduced at the portion of the guide groove which is in engagement with the pin. Also, as described hereinafter, when the upper and the lower substrates are jointed with each other by the solder, the sealing function against leakage can be improved by the meniscus of the solder.

Preferably, the surfaces of the fiber array are metallized, except the surface formed with the guide holes and the surface opposite thereto.

In the case where the sealing between the sealed fiber array and a package such as a transmission module is achieved by the solder, it is preferable to metallize the side of the sealed fiber array, except the surface formed with the guide holes and the surface opposite thereto.

Preferably, the number of the guide pins is at least two, and the centers of the fibers are arranged on the line which connect the centers of the guide pins.

Usually, it is conventional that a multiplex transmission connector is used as a multi-conductor connector to be connected to the sealed fiber array. In the case where the sealed fiber array is connected to the multi-conductor connector, it is of course that each of the guide holes of the sealed fiber array and the corresponding fiber position have to be in conformity with the design of the multi-conductor connector. Thus, as the multi-conductor connector is designed such that the centers of the fibers are arranged on the line connecting the centers of the guide pins at both ends, it is preferable that the centers of the fibers are arranged on the line connecting the centers of the guide pins.

According to another aspect of the present invention, there is provided a method of manufacturing a sealed fiber array which comprises a lower substrate provided in its lengthwise direction with one or more fiber grooves for arranging respective fibers, and one or more guide grooves for arranging respective guide pins to be connected to an external connector; and an upper substrate arranged on the lower substrate so as to fixedly secure the guide pins and the fibers, the upper substrate having the same dimensions in the lengthwise direction and the direction perpendicular thereto as those of the lower substrate; the guide grooves of the lower substrate and the upper substrate forming one or more guide; wherein one or more mask pins each having a diameter larger than that of the guide pin are arranged in the guide grooves to perform metallization of the surface of the lower substrate in which the fiber grooves and guide grooves are formed, while the mask pins are fixedly retained on the lower substrate.

Conventionally, in a method of masking the guide groove with a solder, a flat sheet type mask in the form of a thin-film mask is used as a shadow mask. In general, one may consider to perform metallization for optical connector tips which are arranged as wafer-shaped chips. However, it is difficult to mask the region formed with the guide grooves a flat sheet mask as an integral body and it is thus necessary to use individual masks. Therefore, flat sheets of simple square shape are arranged on the respective regions formed with the guide grooves, thereby requiring a troublesome alignment.

According to the method of present invention, one or more mask pins each having a diameter larger than that of the guide pin are arranged in the guide grooves to perform metallization of the surface of the lower substrate in which the fiber grooves and guide grooves are formed, while the mask pins are fixedly retained on the lower substrate. The guide grooves are originally arranged for forming the guide holes for receiving the guide pins so that an extremely simple alignment is possible, e.g. only by arranging the mask pins.

Preferably, the mask pins comprise a magnetic material, and one or more magnets are arranged on the bottom surface opposite to the surface in which the grooves and guide grooves are formed, so as to fixedly retain the mask pins on the lower substrate.

By retaining the mask pins on the lower substrate, it is possible to perform a simpler and more accurate alignment.

Preferably, the diameter of the mask pins is not smaller than a value which is the diameter of an external connector pin plus 0.06 mm, and not larger than the maximum width of the guide groove plus 0.5 mm.

When the taper-shaped portion of the guide groove is metallized, the solder also flows over the metallized portion, with the result that the external connector pin cannot be inserted. In this taper-shaped portion, the excessive region subjected to undesired metallization is smaller than the remaining portion and it is about 0.03 to 0.1 mm in width. Thus, it is preferred that the diameter of the mask pin is not smaller than a value which is that of an external connector pin plus 0.06 mm.

On the other hand, when the region spaced at least 0.1 mm from the periphery of the guide groove is not metallized, there may occur problems associated with the bond strength or the like. Considering that the internal region spaced about 0.05–0.15 mm from the periphery of the guide groove is also metallized, it is preferred that the diameter of the mask pins is not larger than the maximum width of the guide groove plus 0.5 mm.

Preferably, the maximum width of the guide grooves in the upper substrate is different from that of the guide grooves in the lower substrate, and the diameter of the mask pins is not smaller than that of an external connector pin plus 0.06 mm, and not larger than the maximum width of the guide groove plus 0.1 mm.

In the case where the maximum width of the guide grooves in the upper substrate is different from that of the guide grooves in the lower substrate in such a way, the joint surface of the lower substrate has to be metallized without failure, and it is thus preferred that the diameter of the mask pins is not larger than the maximum width of the guide groove plus 0.1 mm.

Also, there is provided a method of manufacturing a sealed fiber array which comprises a lower substrate provided in its lengthwise direction with one or more fiber grooves for arranging respective fibers, and one or more guide grooves for arranging respective guide pins to be connected to an external connector; and an upper substrate arranged on the lower substrate so as to fixedly secure the guide pins and the fibers, the upper substrate having the same dimensions in the lengthwise direction and the direction perpendicular thereto as those of the lower substrate; the guide grooves of the lower substrate and the upper substrate forming one or more guide; wherein two sealed fiber arrays are produced as an integral body which is then cut into two of the fiber arrays.

In measuring the loss of the connection, the side of the sealed fiber array opposite to the side to be measured should be also connected to each of the connectors. When there is only one sealed fiber array which is constructed such that ambient air is prevented from entering from the side where the guide holes are formed toward the side opposite thereto, the side of the sealed fiber array opposite to the side to be measured cannot be connected to the connectors. In this case, the measurement of the loss of the connection cannot be performed. According to the method of the present invention, two sealed fiber arrays are produced as an integral body, each having the guide holes which are formed effectively to prevent ambient air from entering from the side where the guide holes are formed toward the side opposite thereto. Therefore, the side of the sealed fiber array opposite to the side to be measured can be connected to the each of the connector, so that the measurement of the loss of the connection of the two sealed fiber array as an integral body cannot be performed.

Some embodiments of the sealed fiber array and the method of manufacturing the same according to the invention will be described with reference to the drawings.

BRIEF DESCRIPTION OF THE DRAWINGS

FIGS. 1A to 1D are schematic views showing the press molding for preparing the substrate of the sealed fiber array according to the invention;

FIGS. 4A and 4B are schematic views showing the cutting for the substrate of the sealed fiber array according to the invention;

FIG. 5 is a schematic view showing an assembling process of the sealed fiber array according to the invention;

FIG. 6 is a schematic view showing the system for measuring the connection loss of the sealed fiber array according to the invention;

FIGS. 7A and 7B are schematic views showing the finished product of the sealed fiber array according to the invention;

FIG. 7C is a front view of the part of the sealed fiber array showing the connections of connector pins to the side to be connected to the connector pins shown in FIG. 7A;

FIG. 10 is a schematic view showing the leakage test of the sealed fiber array according to the invention.

BEST MODE CARRYING OUT THE INVENTION

Figure 2A:
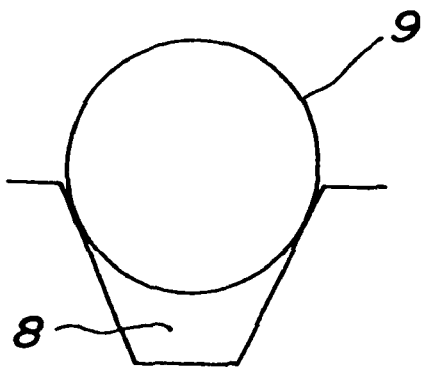
FIGS. 2A and 2B are schematic views showing the metallization for preparing the substrate of the sealed fiber array according to the invention.

FIGS. 1A to 1D are schematic view showing the press molding for preparing the substrate of the sealed fiber array according to the invention. In this embodiment, a press substrate 1 of a lower substrate shown in FIG. 1A, and a press substrate 2 of a upper substrate shown in FIG. 2A, are molded by a press molding with glass. In this case, two substrates as an integral body are obtained in one molding, and are cut into two substrates in an after process.

As to the material for the upper and lower substrates, provided that these substrates are fixedly retained on each other by a solder as described hereinafter, there may occur a problem of thermal stress of the substrates due to a high temperature during an assembling process. If this problem is taken into consideration, it is preferable to use a crystallized glass having an extremely high strength, such as MIRACLON PP-1 wherein "MIRACLON" is a registered trademark of the assignee. As the MIRACLON PP-1 is crystallized glass, uncrystallized glass known as MIRACLON PP-4 is used in press molding.

In this embodiment, the MIRACLON PC-4 is used and the molding is performed at a temperature of 610° C. and a force of 500 Kgf. Consequently, a lower substrate 5 and a upper substrate 7 are produced, as shown in FIG. 1C, which lower substrate is formed with twelve V-grooves 3 for a optical fiber (in the embodiment, the optical fiber is a single-mode fiber as will be described later) having a diameter of $D_r$ and guide grooves 4a and 4b for a guide pin having a diameter of $D_g$, guide grooves being situated on either side of the V-grooves 3. As shown in FIG. 1D, the upper substrate is formed with guide grooves 6a and 6b (each having a depth M) which correspond to guide grooves 4a and 4b (FIG. 1C), respectively.

Here, in defining the V-grooves 3 (FIG. 1C), when the distance from the upper side of the lower substrate 5 to the center of the fiber is $Z_f$, and the distance from the upper side of the lower substrate 5 to the center of the guide pin is $Z_g$, it is necessary to establish the relative position between the V-groove 3 and the guide grooves 4a, 4b, and the absolute value of the depths of the guide grooves 6a, 6b among the lower substrate 5 (FIG. 1C), the upper substrate 7 (FIG. 1D) and the diameter $D_r$ the optical fiber (FIG. 1C), when the optical fibers contacts the surface of the upper substrate 7 (FIG. 1D) formed with the guide grooves 6a and 6b, the following relation should be fulfilled.

$$Z_f = Z_g, M = (D_g - D_f)/2$$

In practice, when the accuracy of the processing, and the dispersion of diameters $D_f$ and $D_g$ of the optical fiber and the guide pin, are considered, $$M \geq (D_g - D_f)/2$$

therefore, clearance for guide holes which are after formed, are provided.

These lower substrate 5 (FIG. 1C) and upper substrate 6 (FIG. 1D) have the length of 7 mm, the width of 10 mm and the thickness of 3 mm, respectively. Further, each of the lengths of the guide grooves 4a, 4b (FIG. 1C) and 6a, 6b (FIG. 1D) is 4 mm from the end face to be connected to the connectors. Therefore, the length for receiving the guide pins into, is secured. In this case, the length for sealing is 3 mm and thus enough to maintain the sealing function.

Figure 2B:
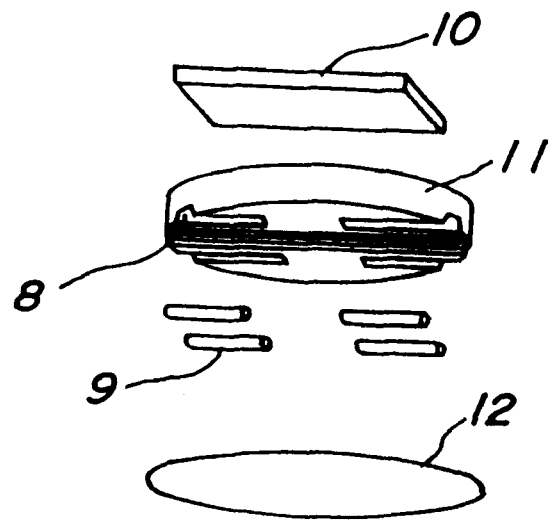

FIGS. 2A and 2B are schematic views showing the metallization for preparing the substrate of the sealed fiber array according to the invention. After the substrates are press molded as described with reference to FIGS. 1A to 1D, the surface of the upper substrate 5 (FIG. 1C) formed with the V-grooves 3 (FIG. 1C) and the guide grooves 4a, 4b, as well as the side of the lower substrate 7 (FIG. 1D) formed with the guide grooves 6a and 6b (FIG. 1D), are metallized for jointing these surface with each other by a solder in an after processing.

In this embodiment, a Ti layer having a thickness of 1000 Å, a Pt layer having that of 1000 Å, and an Au layer having that of 1 μm are sequentially provided using a spatter device. As the jointing is performed using an Au-based solder as is described hereinafter, an Au which readily becomes wet is provided. However, as the Au is not directly provided on glass or ceramics, a Cr or Ti is firstly provided on the glass as the first coating, and the Au is provided on Cr or Ti.

In the case where the single-mode fibers are used as the optical fibers such as the embodiment, the diameter thereof is about 10 μm, it is required to arrange these single-mode fibers at the accuracy of about 1 μm to perform an optical coupling between the optical fibers and optical elements (a laser diode, photodiode or the like) in a package. The V grooves 3 (FIG. 1C) itself can be processed, but the accuracy of the V grooves 3 (FIG. 1C) is degraded when thick metallic layers are provided. Therefore, in the embodiment, the metallic layers are made so that the thickness of each of those layers is sufficiently thin and thus the accuracy of the V grooves (FIG. 1C) is not degraded.

To prevent the solder from flowing over the guide holes formed in the after process, mask pins 9 made of a magnetic material are arranged in respective the guide grooves 8, and as is shown in FIG. 2B, those mask pins 9 are fixedly secured to a substrate 11 by a samarium based ferromagnetic body 10, and the surface of the substrate 11 where the mask pins 9 are fixedly secured, is faced to a target 12. In the embodiment, as the mask pins 9, SUS 420J having the diameter of 1 mm is used. The SUS 420J is used in a conventional optical connector. When the mask pins 9 are arranged in respective grooves 8, the tip ends of the mask pins 9 are contacted to ends in which the guide grooves 8 are blinded.

Figure 3A:
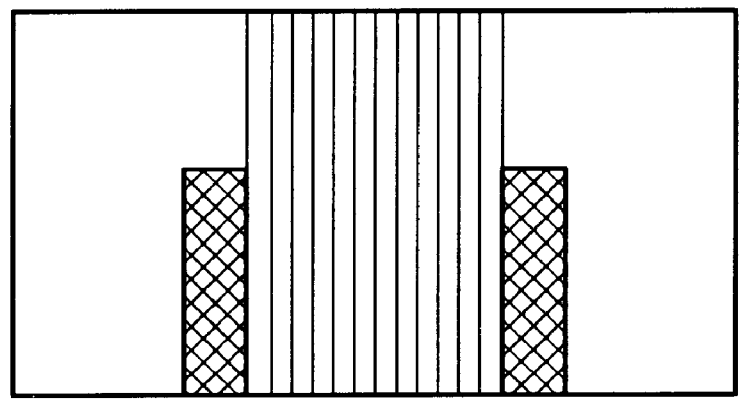
FIGS. 3A and 3B are schematic views which correspond, respectively, to photographs of the upper and lower substrates each having a rectangular profile.
Figure 3B:
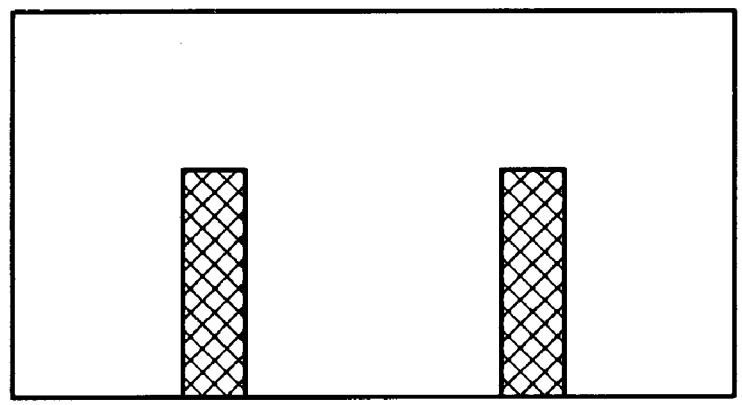

In the embodiment, by using the mask pins 9 each having the diameter of 1 mm, the width of 0.87 mm toward the direction perpendicular to the lengthwise direction of each of the guide grooves 8 are masked. By such a masking, guide pins for multiple transmission connector having the diameter of 0.7 mm is arranged on respective guide grooves 8, the solder cannot not flow over the guide grooves 8 during the jointing between the upper substrate and the lower substrate. By such a metallization, the surface of the upper substrate except the guide grooves, and the surface of the lower substrate except the guide grooves, are metallized, as illustrated in FIGS. 3A and 3B which correspond, respectively, to photographs of the upper and lower substrates each having a rectangular profile, and in which the guide grooves free from metallization are indicated by cross-hatching.

Further, the diameter of the mask pins 9 is not smaller than a value which is that of an external connector pin plus 0.06 mm, and not larger than a value which is the sum of the maximum width of the guide grooves 4a and 4b (FIG. 1C) plus 0.5 mm.

When the taper-shaped portion of each of the guide grooves 4a and 4b (FIG. 1C) is metallized, the solder also flows over the portion, and thus the guide pins for multiple transmission connector cannot be inserted. In the taper-shaped portion, as the flowing of the metallization is smaller than the remaining portion and it is about 0.03 to 0.1 mm, the mask pins 9 is made so that a diameter of the mask pins 9 is not smaller than a value which is that of each pin for multiple transmission connector plus 0.06 mm.

On the other hand, the region spaced at least 0.1 mm from the periphery of the guide grooves 4a and 4b (FIG. 1C) is not metallized, there may be occur problems associated with the bond strength or the like, occur. Considering that the internal region spaced about 0.05 to 0.15 mm toward the diameter of each of the guide pins 9 is also metallized, the diameter of the mask pins 9 is not larger than a value which is the maximum width of each of the guide grooves 4a and 4b of the lower substrate 5 (FIG. 1C) plus 0.5 mm.

In the case where the maximum width of each of the guide grooves 6a and 6b (FIG. 1D) in the upper substrate 7 (FIG. 1D) is different from that of each of the guide grooves 4a and 4b (FIG. 1C) in the lower substrate 5 (FIG. 1C), so that steps for defining spaces which functions as solder ponds (It is described later.), the joint surface of the lower substrate 5 (FIG. 1C) has to be metallized without failure, the diameter of the mask pins 9 is not larger than a value which is the maximum width of the guide grooves 4a and 4b plus 0.1 mm.

FIGS. 4A and 4B are schematic views showing a cutting for the substrate of the sealed fiber array according to the invention. In the embodiment, after the substrates are metallized as described in FIGS. 2A and 2B, the cutting for the lower substrate 13 is carried out in the vertical and parallel directions of the lengthwise direction of the V grooves and the guide grooves 15 using a dicing cutter as shown in FIG. 4A, and that of the upper substrate 16 is carried out in the vertical and parallel directions of the lengthwise direction of the guide grooves 17 using the dicing cutter as shown in FIG. 4B. Carrying out such cuttings is preferable in the case where the side is used as a reference face at a polishing or the like in after process.

As is shown in FIGS. 4A and 4B, the lower substrate 13 and the upper substrate 16 are cut into a square shaped body, each of which has two of the upper substrates or the lower substrates of the sealed fiber array. As the guide grooves 15 (FIG. 3A) and 17 (FIG. 3B) are formed, a measurement of the loss of the connection can be performed.

FIG. 5 is a schematic view showing an assembling process of the sealed fiber array according to the invention. In this case, only the left-half of the lower substrate and the upper substrate formed as shown in FIGS. 4A and 4B, is shown. In the embodiment, after the cutting of the substrate as described with reference to FIG. 4, single-mode fibers 18 on which the Ni layer having a thickness of 1 μm and the Au layer having a thickness of 1 μm are coated, or which are metallized, are arranged in respective V grooves 20 in the lower layer; a sheet solder 22 is arranged on the surface of the lower substrate 19 formed with V grooves 20, except guide grooves 21; a upper substrate 23 is arranged on the sheet solder 22; and a weight of about 700 g is applied with such a situation using a jig.

It is considered that a solder of Au/Sn which is generally used as sealing a module with the fiber arrays, is used as the solder, but a eutectic solder of Au/Ge whose eutectic temperature is higher than that of Au/Sn. Further, during a heating, a melting of the solder is performed by spraying a $N_2$ gas to prevent the solder from being oxidized.

ing to the present invention in which the guide holes extend halfway at the lengthwise direction thereof, the measurement of the loss of the connection cannot be carried out. Therefore, the measurement of the loss of the connection is carried out as to the fiber array for a module which comprises two sealed fiber arrays as an integral body, before the integral body is cut into two sealed fiber arrays in an after cutting as shown in FIG. 7.

In FIG. 6, a laser diode 24 is connected to the one end of the fiber array for a module through a single-mode multiple transmission master connector 25, and the other end thereof is connected to a optical power measuring apparatus 29 through a multi-mode multiple transmission connector 27 and a detector 28.

In the embodiment, the measurement of the loss of connection is carried out as to the end side of the fiber array 26 where the single-mode multiple master connector 25 is connected. A weight is applied at the optical axis by a clip when the multiple transmission connector is connected, however, in this measuring method, three connectors are connected and thus the connection cannot be done with an ordinary clip, so that an exclusive clip is made, and a weight of 1 Kg is applied. Further, at the side of the multi-mode multiple transmission connector 27, when the detector detects the optical power directly, an optical leakage (light originally lost) arising from the connection between the single-mode multiple transmission master connector 25 and the fiber array 26 reaches the detector 28 through a clad, because the length of the lengthwise direction of the fiber array 26 is short and it is 14 mm, in this case. Therefore, in the embodiment, one or more multi-mode fibers are connected in such a manner that light is incident of the detector with the state substantially free from a clad mode. In this way, as one or more connectors are required to be connected to the side opposite to the side to be measured, it is necessary to produce two sealed fiber arrays as an integral body.

The result of this measurement is shown in the following Table 1. In Table 1, 1 to 10 in first paragraph indicates each channel, P and N in second and third paragraphs indicate the case where one end of the fiber array 26 is connected to the single-mode multi-channel master connector 25 and the case where the other end thereof is connected to the single-mode multi-channel master connector 25, respectively, and numerals in the second and third paragraphs indicate the loss measured at each channel in dB, respectively. As shown in Table 1, this also exhibits good property for the single-mode fiber.

TABLE 1

| C | 1 | 2 | 3 | 4 | 5 | 6 | 7 | 8 | 9 | 10 |
|---|---|---|---|---|---|---|---|---|---|---|
| P | 0.25 | 0.15 | 0.18 | 0.15 | 0.20 | 0.21 | 0.20 | 0.20 | 0.32 | 0.47 |
| N | 0.18 | 0.28 | 0.21 | 0.20 | 0.15 | 0.19 | 0.12 | 0.19 | 0.21 | 0.22 |

After the assembling process as described with reference to FIG. 5, an electroless plating or metallization of Ni and Au is performed on the surfaces of the sealed fiber array except the surface formed with guide holes and the surface opposite thereto. After which, an optical polishing is carried out at a desired angle on the basis of the side face formed during the cutting for the substrate.

FIG. 6 is a schematic view showing the system for measuring the connection loss of the sealed fiber array according to the invention. In the sealed fiber array accord- After the measurement of the loss of the connection, the fiber array 26 (FIG. 6) which comprises two sealed fiber array as the integral body, is cut at the center thereof, so that two sealed fiber arrays are produced separately. After which, the optical polishing similar to the polishing process is performed on the section of the sealed fiber array, there is obtained a sealed fiber array shown in FIG. 7A as seen from the end side of the connection of the connector and FIG. 7B as seen from the end side of the connection of the optical element.

FIG. 7C is a front view of the part of the sealed fiber array showing the connections of connector pins to the side to be connected to the connector pins shown in FIG. 7A. In this case, the maximum width of the guide grooves 31a and 31b is different from that of the guide grooves 33a and 33b and, in particular, the maximum width of each of the guide grooves 31a and 31b is wider than that of the guide grooves 33a and 33b. Therefore, steps 34 are formed, which define spaces functioning as solder ponds. When assembling, such spaces functions as buffers during crushing the solder. That is, it is necessary to crush the solder until a fibers-press face 35 of the upper substrate 30 presses single-mode fibers 36.

However, the solder only flows over the single-mode fibers 36 projecting in the lengthwise direction of V-grooves 37 when assembling, so that the crushed solder has no way to flow over and thus the solder is not crushed as long as a heavy weight is not applied.

Therefore, it is preferable to use a seat solder whose volume is controlled previously when assembling, however, in practice, it is not easy to control the volume of the seal solder.

Either the maximum width of the guide grooves 31a and 31b can be wider than that of the guide grooves 33a and 33b, or vice versa, the joint side which has a wider maximum width is metallized, and the solder flows over that side.

As a result, the solder can be pooled at such step 34 to some degree, and thus the solder can be crushed more easily.

A shift width not smaller than 20 $\mu$m is enough to obtain such an effect, though the shift width not larger than 300 $\mu$m is preferable in a viewpoint of the stress of the solder. In the embodiment, the shift width is 50 $\mu$m.

Further, in the embodiment, clearance between the guide pins to be inserted into the guide holes and the guide holes is 1 $\mu$m.

Figure 8A:
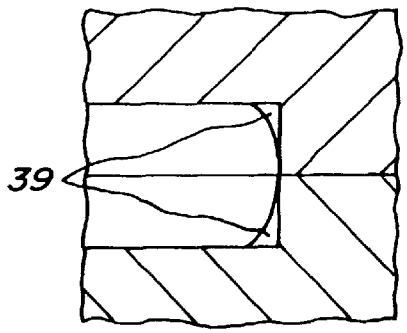
FIG. 8A is a sectional view of the tip end of a guide hole of known sealed fiber array.
Figure 8B:
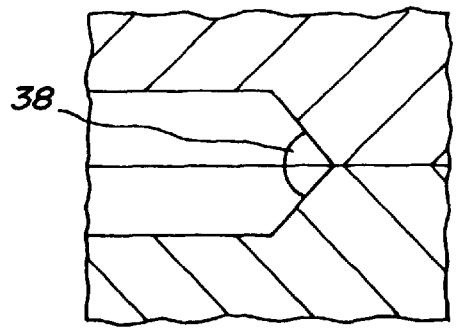
FIGS. 8B to 8F are sectional views of the tip end of the guide hole in the sealed fiber array according to the invention.
Figure 8C:
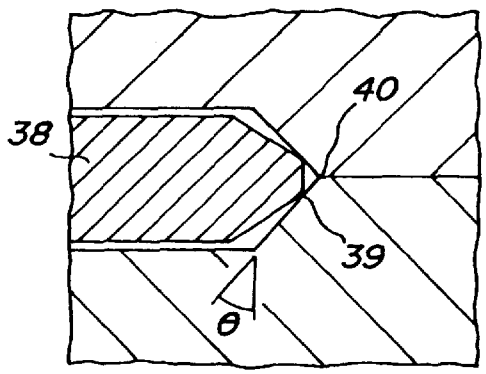
Figure 8D:
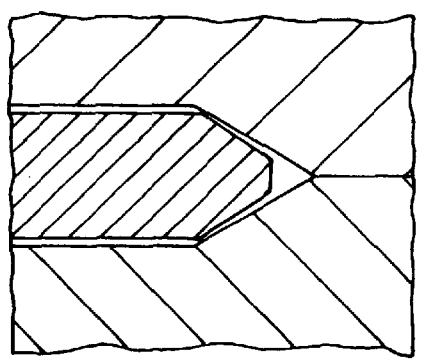
Figure 8E:
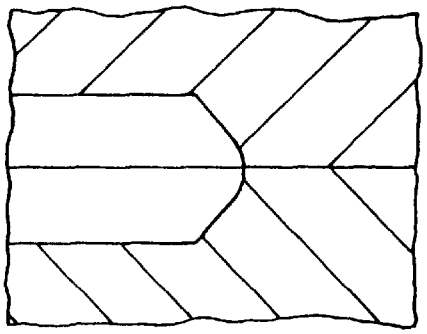
Figure 8F:
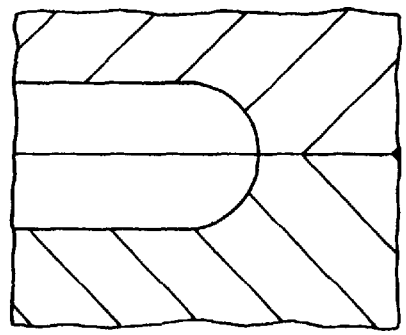

FIG. 8A is a sectional view of a tip end of a guide hole of known sealed fiber array, and FIGS. 8B to 8F are sectional views of a tip end of a guide hole of a sealed fiber array according to the invention. In this embodiment, the tip end of the guide hole has taper shape (e.g., FIG. 8B) or a hemispherical shape (FIG. 8F).

As the tip end has such a shape, a sealing function for leakage where a meniscus 38 (FIG. 8B) is provided, improves compared with the case where a meniscus 39 (FIG. 8A) is not provided.

Further, such a shape makes the bonding strength high. On the other hand, in the prior shape as shown in FIG. 8A, the stress concentrates at the edges of the grooves, so that cracks or the like arise from the stress. As a result, the prior fiber array is not reliable compared with that according to the present invention.

Such a effect is notable when the inclination angle θ (FIG. 8C) is not smaller than 10°. However, when the angle θ is so large, a problem associated with the imposed stress occurs when a pin 38 (FIG. 8C) is inserted into the guide hole deeply. That is, a force application point 39 (FIG. 8C) is away from a fulcrum 40 (FIG. 8C), and thus big power is applied due to the principle of the lever, so that the upper substrate may be separated from the lower substrate. Such a relationship is shown in FIG. 8D. Therefore, it is preferable that the inclination angle θ (FIG. 8C) is not larger than a cone angle of the guide pin 38. As the inclination angle of the conventional guide pin is about 56°, the inclination angle is set so as to be not larger than 56°. In this embodiment, the inclination angle is 30°.

Further, a shape shown in FIG. 8E and a hemispherical shape shown in FIG. 8F can be employed as the tip end of the guide hole.

Figure 9A:
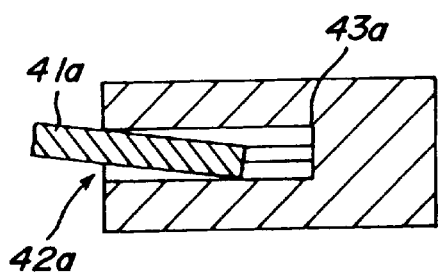
FIGS. 9A and 9B are horizontal sectional view and vertical sectional view, respectively, of the known sealed fiber array.
Figure 9C:
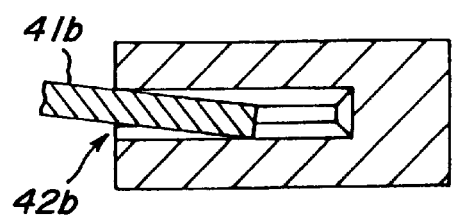
FIGS. 9C and 9D are horizontal sectional view and vertical sectional view, respectively, of the sealed fiber array according to the invention.
Figure 9B:
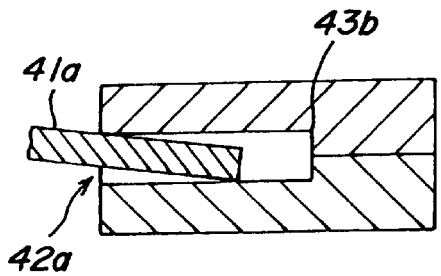
Figure 9D:
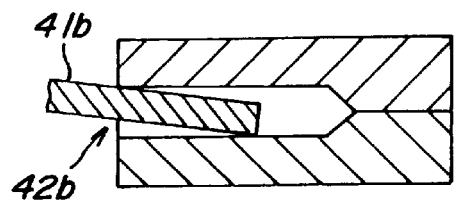

FIGS. 9A and 9B are horizontal sectional view and vertical sectional view, respectively, of the known sealed fiber array, and FIGS. 9C and 9D are horizontal sectional view and vertical sectional view, respectively, of the sealed fiber array according to the invention. When a guide pin 41a is pull out or insert into the guide hole, stress is concentrated at blind portions 43a and 43b unless the axis of the guide pin 41a is aligned with that of a guide hole 42, so that cracks or the like may occur.

On the other hand, since the tip end of the guide hole 42b has a vertical taper shape, stress in the vertical and horizontal directions can be mitigated.

For the finished product of the sealed fiber array obtained as described above, a leakage test is carried out by a He leakage detector as shown in FIG. 10. In FIG. 10, a He gas vessel 45 spraying a He gas as shown at 44, a sample positioning portion 47 on which a sample 46 is placed, a leakage detector 48 detecting an amount of the leakage of the sample 46, and a vacuum 49 connected to the leakage detector 48 are shown. The leakage detector detects $1 \times 10^{-10}$ atom-cc/sec as a minimum leakage. As a result of experiments, any leakage is not detected by the He leakage detector.

According to the embodiment, to prevent ambient air is from entering from the side where the guide holes are formed toward the side opposite thereto, a sealing function can be obtained by forming guide holes, so that the elements in the package may not degrade due to the ambient air entering from the gaps between the guide holes and the guide pins into the package.

The invention is not limited to the illustrated embodiment, and various modifications thereof may be made without departing from the scope of the invention. For example, in the embodiment, the guide holes are provided such that the length of each of the guide grooves in the upper substrate in the lengthwise direction is the length not larger than the length of the upper substrate in the lengthwise direction, however the guide holes can be formed so that each of the guide grooves have a same length in the lengthwise direction thereof as that of the lower substrate in the lengthwise direction thereof, for the guide grooves, an adhesive is filled at least partly in the guide grooves except the region which extends from one end thereof over a distance, e.g. 3 mm from the end face of the connection of the connector, which is not greater than the length in the lengthwise direction thereof, so that the guide grooves are formed.

Also, advantageous effects similar to those of the illustrated embodiments can be obtained in such a manner that each of the guide grooves has a length in the lengthwise direction thereof, which is same as that of the lower substrate in the lengthwise direction thereof, each of the guide pins extending over a length which is not greater than the length of the guide grooves in the lengthwise direction thereof, and an adhesive is filled between the guide grooves and the corresponding guide pins.

The upper substrate and the lower substrate are made of glass in the embodiment, but these can be made of ceramics. The metallization of the lower substrate is performed by spattering, but it can be done by vapor-deposition of Au. An Au/Si-based solder may be advantageously used as the Au-based solder.

Moreover, the relation of the position among the V grooves, the upper substrate and the optical fibers can be settled as following, when the surface of the upper substrate formed with the guide grooves, is touched on the surface of the lower substrate formed with the V-grooves and the guide grooves.

$Z_f=Z_g=D_f/2, M=(D_g-D_f)/2$

In this case, also, clearance is provided on the guide holes similar to the case where equation 1 is employed. In the case where the bottoms in the guide grooves of the upper substrate touch on the guide pins, also, the relation similar to equation 1 is realized. In this case, because of the same reason as the case where the embodiment is carried out, M is determined as following;

$M \leq (D_g-D_f)/2$

In this case, clearance is provided on the optical fiber.

What is claimed is:

1. A sealed fiber array comprising:
a lower substrate provided in its lengthwise direction with one or more fiber grooves for arranging respective fibers, and one or more guide grooves for receiving respective guide pins of an external connector; and
an upper substrate arranged on said lower substrate to cover said guide grooves and to fixedly secure said fibers, said upper substrate having the same dimensions in the lengthwise direction and the direction perpendicular thereto as those of the lower substrate, said upper substrate further having one or more guide grooves aligned with the guide grooves in said lower substrate for receiving respective guide pins of the external connector;
wherein said guide grooves of the lower substrate and said upper substrate form one or more guide holes such that ambient air is prevented from entering from the side where the guide holes are formed toward the side opposite thereto, and each of said guide grooves of the upper substrate has a maximum width which is greater than that of the corresponding guide groove in the lower substrate, so as to form steps for defining spaces including solder ponds.

2. The sealed fiber array according to claim 1, wherein each of said guide grooves has a length in the lengthwise direction thereof, which is not greater than that of the lower substrate in the lengthwise direction thereof.

3. The sealed fiber array according to claim 1, wherein each of said guide grooves has a length in the lengthwise direction thereof, which is same as that of the lower substrate in the lengthwise direction thereof, and an adhesive is filled at least partly in said guide grooves except the region which extends from one end thereof over a distance which is not greater than the length in the lengthwise direction thereof.

4. The sealed fiber array according to claim 1, wherein each of said guide grooves has a length in the lengthwise direction thereof, which is same as that of the lower substrate in the lengthwise direction thereof, each of said guide pins extending over a length which is not greater than the length of said guide grooves in the lengthwise direction thereof, and an adhesive is filled between said guide grooves and the corresponding guide pins.

5. The sealed fiber array according to claim 1, wherein said upper and lower substrates comprise ceramics or glass.

6. The sealed fiber array according to claim 1, wherein said lower substrate is made by a press molding.

7. The sealed fiber array according to claim 5, wherein the surface of said lower substrate formed with said fiber grooves and said guide grooves, and the surface of said upper substrate to be jointed on said surface of the lower substrate, are metallized and jointed with each other by a solder.

8. The sealed fiber array according to claim 7, wherein said solder comprises an Au-based solder.

9. The sealed fiber array according to claim 8, wherein said metallized surfaces comprise a vapor-deposited or spattered thin Au film.

10. The sealed fiber array according to claim 6, wherein said surface of the lower substrate, except the guide grooves, is metallized.

11. The sealed fiber array according to claim 1, wherein said upper substrate is formed with guide grooves corresponding to of said guide groove to extend in the lengthwise direction thereof.

12. The sealed fiber array according to claim 11, wherein each of the guide holes has tip end of a tapered or hemispherical shape.

13. The sealed fiber array according to claim 1, wherein the surfaces of said fiber array are metallized, except the surface formed with said guide hole and the surface opposite thereto.

14. The sealed fiber array according to claim 1, wherein the number of said guide pins is at least two, and said fibers having centers which are arranged on a line connecting centers of said guide pins.

15. A method of manufacturing a sealed fiber array which comprises a lower substrate provided in its lengthwise direction with one or more fiber grooves for arranging respective fibers, and one or more guide grooves for arranging respective guide pins to be connected to an external connector; and an upper substrate arranged on said lower substrate so as to fixedly secure said guide pins and said fibers, said upper substrate having the same dimensions in the lengthwise direction and the direction perpendicular thereto as those of the lower substrate; said guide grooves of the lower substrate and said upper substrate forming one or more guide; wherein one or more mask pins each having a diameter larger than that of said guide pin are arranged in said guide grooves to perform metallization of the surface of said lower substrate in which said fiber grooves and guide grooves are formed, while said mask pins are fixedly retained on said lower substrate.

16. The method according to claim 15, wherein said mask pins comprise a magnetic material, and one or more magnets are arranged on the bottom surface opposite to the surface in which said grooves and guide grooves are formed, so as to fixedly retain said mask pins on said lower substrate.

17. The method according to claim 15, wherein the diameter of said mask pins is not smaller than a value which is that of an external connector pin plus 0.06 mm, and not larger than a value which is the maximum width of said guide groove plus 0.5 mm.

18. The method according to claim 15, wherein the maximum width of said guide grooves in said upper substrate is different from that of said guide grooves in the lower substrate, and the diameter of said mask pins is not smaller than that of an external connector pin plus 0.06 mm, and not larger than the maximum width of said guide groove plus 0.1 mm.

19. A method of manufacturing a sealed fiber array which comprises a lower substrate provided in its lengthwise direction with one or more fiber grooves for arranging respective fibers, and one or more guide grooves for arranging respective guide pins to be connected to an external connector; and an upper substrate arranged on said lower substrate so as to fixedly secure said guide pins and said fibers, said upper substrate having the same dimensions in the lengthwise direction and the direction perpendicular thereto as those of the lower substrate; said guide grooves of the lower substrate and said upper substrate forming one or more guide; wherein two sealed fiber arrays are produced as an integral body which is then cut into two of said fiber arrays.

20. A sealed fiber array comprising:
a lower substrate provided in its lengthwise direction with one or more fiber grooves for arranging respective fibers, and one or more guide grooves for receiving respective guide pins of an external connector; and
an upper substrate arranged on said lower substrate to cover said guide grooves and to fixedly secure said fibers, said upper substrate having the same dimensions in the lengthwise direction and the direction perpendicular thereto as those of the lower substrate;

wherein said guide grooves of the lower substrate and said upper substrate form one or more guide holes such that ambient air is prevented from entering from the side where the guide holes are formed toward the side opposite thereto, and wherein the surfaces of said fiber array are metallized, except the surface formed with said one or more guide holes and the surface opposite thereto.

* * * * *